(12) United States Patent
Anderson et al.

(10) Patent No.: US 6,696,522 B2
(45) Date of Patent: Feb. 24, 2004

(54) POWDER COATING OF NON-GELLED PRODUCT OF ADDITION POLYMER A AND POLYMER B WITH MUTUALLY REACTIVE GROUPS

(75) Inventors: Jeffrey L. Anderson, Racine, WI (US); Alan J. Pekarik, Spring, TX (US); Edward Tokas, Cary, NC (US)

(73) Assignee: Johnson Polymer, Inc., Sturtevant, WI (US)

( * ) Notice: Subject to any disclaimer, the term of this patent is extended or adjusted under 35 U.S.C. 154(b) by 154 days.

(21) Appl. No.: 09/930,912

(22) Filed: Aug. 16, 2001

(65) Prior Publication Data
US 2002/0156188 A1 Oct. 24, 2002

Related U.S. Application Data

(63) Continuation of application No. 08/967,848, filed on Nov. 12, 1997, now abandoned.

(51) Int. Cl.$^7$ .......... C08L 33/02; C08L 33/14; C08L 63/00; C08L 67/03; C08L 77/08
(52) U.S. Cl. .......... 525/170; 525/100; 525/103; 525/107; 525/117; 525/118; 525/119; 525/123; 525/168; 525/169; 525/178; 525/182; 525/183
(58) Field of Search .............. 525/168, 169, 525/170, 107, 117, 118, 119, 178, 182, 183, 123, 100, 103, 187, 166

(56) References Cited

U.S. PATENT DOCUMENTS

| | | | | |
|---|---|---|---|---|
| 3,398,014 A | * | 8/1968 | Turner | |
| 3,562,355 A | | 2/1971 | Holden | 260/859 |
| 3,835,200 A | | 9/1974 | Lee, Jr. | 260/876 B |
| 3,978,160 A | | 8/1976 | Seiler et al. | 260/874 |
| 4,041,103 A | | 8/1977 | Davison et al. | 260/857 |
| 4,069,274 A | * | 1/1978 | Shibata et al. | 525/170 |
| 4,167,507 A | | 9/1979 | Haaf | 525/92 |
| 4,180,528 A | | 12/1979 | Fagerburg | 525/70 |
| 4,217,377 A | * | 8/1980 | Shay et al. | 427/195 |
| 4,246,369 A | * | 1/1981 | McGinniss et al. | 525/126 |
| 4,250,272 A | | 2/1981 | Ewins, Jr. et al. | 525/89 |
| 4,285,849 A | * | 8/1981 | Dowbenko et al. | 525/438 |
| 4,341,682 A | * | 7/1982 | Tobias | 523/409 |
| 4,347,339 A | | 8/1982 | Boevink et al. | 525/180 |
| 4,387,189 A | | 6/1983 | Brandstetter et al. | 525/68 |
| 4,480,058 A | * | 10/1984 | Ting et al. | 523/404 |
| 4,481,331 A | | 11/1984 | Liu | 525/92 |
| 4,529,787 A | | 7/1985 | Schmidt et al. | 526/317 |
| 4,546,160 A | | 10/1985 | Brand et al. | 526/320 |
| 4,585,813 A | * | 4/1986 | Brown et al. | 523/409 |
| 4,851,474 A | | 7/1989 | Willis | 525/92 |
| 5,008,334 A | | 4/1991 | Harris et al. | 525/109 |
| 5,122,553 A | | 6/1992 | Takayama et al. | 523/514 |
| 5,194,499 A | | 3/1993 | Hergenrother | 525/91 |
| 5,296,551 A | * | 3/1994 | Yukawa et al. | 525/124 |
| 5,314,954 A | | 5/1994 | Ohishi et al. | 525/132 |
| 5,314,962 A | | 5/1994 | Otsu et al. | 525/280 |
| 5,362,819 A | | 11/1994 | McBain et al. | 525/404 |
| 5,384,184 A | | 1/1995 | Saiki et al. | 428/230 |
| 5,389,705 A | * | 2/1995 | Huemke et al. | 523/417 |
| 5,496,876 A | | 3/1996 | Jacquemin et al. | 524/155 |
| 5,631,329 A | | 5/1997 | Yin et al. | 525/417 |

FOREIGN PATENT DOCUMENTS

| | | | |
|---|---|---|---|
| EP | 0 048 391 A | | 3/1982 |
| EP | 0 687 690 A1 | | 8/1995 |
| JP | 69-21559 | * | 10/1965 |
| JP | 59-142242 | * | 8/1984 |
| JP | 63-297465 | * | 12/1988 |
| JP | 2-199127 | * | 8/1990 |
| JP | 2-279729 | | 11/1990 |
| JP | 1-324731 | * | 12/1998 |
| WO | WO 92 14788 A | | 3/1992 |

OTHER PUBLICATIONS

Database WPI Section Ch, Week 9101 Derwent Publications Ltd., London, GB, AN 91–003187 XP002102521 & JP 02 279729 A (Chisso Corp) Abstract of Nov. 15, 1990.

* cited by examiner

Primary Examiner—Robert Sellers
(74) Attorney, Agent, or Firm—Neil E. Hamilton; Renee J. Rymarz; Warren R. Bovee

(57) ABSTRACT

A substantially non-gelled polymeric composition is disclosed and comprises the reaction product of an A polymer which is an addition polymer having 3.5 or more reactive functional groups per polymer chain and a B polymer having about 2 to about 3 functional groups per polymer chain that are co-reactive with the reactive functional groups of the A polymer. Also disclosed is a process for preparing such polymeric compositions, powder coatings and 100% solids ink resins prepared with such polymeric compositions, and a method for deglossing a powder coating using such polymeric compositions.

10 Claims, No Drawings

POWDER COATING OF NON-GELLED PRODUCT OF ADDITION POLYMER A AND POLYMER B WITH MUTUALLY REACTIVE GROUPS

REFERENCES TO RELATED APPLICATIONS

This application is a continuation of application of U.S. Ser. No. 08/967,848, filed Nov. 12, 1997, abandoned.

BACKGROUND OF THE INVENTION

1. Field of the Invention

This invention relates to polymeric compositions that are highly functional polymers with a relatively high molecular weight and are substantially free of gelling. Moreover, when used in aqueous solution they provide a relatively low solution viscosity. The invention also relates to the preparation of such polymeric compositions. The polymeric compositions of this invention are particularly useful as polymeric support resins or compatabilizing additives, or for use in overprint varnishes, inks, pigment dispersions, powder coatings, adhesives and the like. The invention also relates to a deglossed acrylic epoxy hybrid powder coating and method of preparing the same, a powder coating composition comprising the polymeric compositions of this invention, as well as 100% solids resin inks.

2. Related Background Art

Polymeric compositions that are block copolymers having an $A(BA)_n$ structure are well known. For example, U.S. Pat. No. 5,362,819 describes an ABA curable block copolymer with an A block that is an unsaturated polyester, preferably having a mono-, or less desirably a di-, hydroxyl, carboxylic or amine end group, and a B block that is a flexible polymer having a glass transition temperature (Tg) of O° C. or less. The flexible polymers are said to include those prepared from conjugated diene monomers, as well as polyethers or saturated polyester, which are linked to the A block by an ester, amide, urea or urethane group.

U.S. Pat. No. 4,347,339 describes a water soluble cationic block copolymer having a first polymer block having amino functional groups, a majority of which are quaternary amino groups, and a second polymer block having amino functional groups, a majority of which are not quaternary amino groups. The polymer blocks may be linked with bridges of other polymers, but are preferably linked by including a functional group such as a chloride or epoxide in the first polymer block that reacts with the amino functional groups of the second polymer block.

U.S. Pat. No. 4,851,474 describes a block copolymer comprising at least one polyester block and an elastomeric polymer block such as a polymer of one or more conjugated dienes. The elastomeric block is functionalized to incorporate only terminal functional groups, i.e., no more than 2 functional groups per polymeric block.

U.S. Pat. No. 5,008,334 describes resins containing an ABA block copolymer having an A block which is a reaction product of a diol and one or more diepoxides and a B block of an epoxy-capped, carboxyl-terminated polybutadiene or polybutadiene/acrylonitrile copolymer. Amine resins which are prepared from a resin that is a mixture of (i) the reaction product of a diol and at least one diepoxide and (ii) the ABA block copolymer are used in electrocoating formulations.

U.S. Pat. No. 5,314,954 describes aromatic polyester-polystyrene block copolymers produced by the polycondensation of styrene polymers having terminal functional groups, e.g. hydroxy, amino or carboxyl groups, with an excess of aromatic dicarboxylic acid dihalides and then subjecting the resulting condensation product to interfacial polymerization with aromatic dihydroxy compounds. These aromatic polyester-polystyrene block copolymers are said to have a minimum of uncopolymerized styrene and to be useful for the preparation of optical instruments.

Polyester block copolymers that provide an elastic yarn having a high elastic recovery and a high heat resistance are disclosed by U.S. Pat. No. 5,384,184.

The polyester block copolymer comprises (A) 30 to 90% by weight of polyester segments comprising a benzenedicarboxylic acid as the main acid component and a diol having 5 to 12 carbon atoms between the hydroxyl groups as the main glycol component and (B) 70 to 10% by weight of polyester segments comprising an aromatic dicarboxylic acid as the main acid component and ethylene glycol, trimethylene glycol, tetramethylene glycol or 1,4-cyclohexane dimethanol as the main glycol component.

U.S. Pat. No. 5,496,876 describes a polyetheramide block copolymer constituted by the copolycondensation of polyamide polymers having reactive end groups with polyether sequences having reactive end groups. These polyetheramide block copolymers are blended with a styrene/diene copolymer to form thermoplastic polymeric compositions.

U.S. Pat. No. 4,180,528 describes an ABA type block copolymer having an A block that is an addition polymer and a B block that is a linear saturated polyester. The A block and B block are joined by addition polymerization.

European Patent Application Publication No. 0687690/A describes a high temperature polymerization process to produce terminally unsaturated oligomers having relatively low molecular weights. It is further disclosed that the terminally unsaturated oligomers having a carboxylic acid group can be reacted with polyfunctional alcohols having two or more alcohol functionalities to form polyesters. There is, however, no disclosure of terminally unsaturated oligomers having relatively high functionality.

One particular use of polymeric compositions is as 100% solids resin. 100% solids resin compositions have many possible applications. For example, powder coating processes are well known and are typically fusion-coating processes in that powder particles are fused or melted at some point in the process. Powder coating processes are often advantageous because of their essentially nonvolatile nature. The powder ("coating powder") used in the powder coating process is coated onto a substrate surface, melted or fused to form a continuous coating, and cooled to harden the resultant coating. The heat can melt the powder to consolidate the powder to a coating film, or can cause the powder to react together, as in a polymerization or curing process, to consolidate the powder to a coating film.

One type of coating powder uses acid functional acrylic resins in its formulation. Such acrylic formulations are commonly formulated with epoxy to make what is known as acrylic epoxy hybrid powder coatings. An example of such an acrylic resin being used for this purpose is SCX-819, available from Johnson Polymer, Inc., Sturtevant, Wis., which has found wide use in the appliance market. However, the use of acrylics could be extended into other powder coating applications with the development of 100% solids resin polymers that have improved flexibility, and improved polyester compatibility, and by finding ways to degloss acrylic hybrids without sacrificing mechanical properties.

Another possible use of 100% solids resin compositions is as plastic additives. Plastics additives are commonly used in the polymer industry. Additives are used as compatibilizers, thickeners, plasticizers, coextrusion additives to improve extrusion rheology and extruded product properties. Solid resins have also been used as hot-melt adhesives.

100% solids resin inks are mixtures of pigment components dispersed or dissolved in 100% solids resin carrier components. 100% solids resin inks are commonly used in applications such as letterpress, dry offset, lithography and as toners for xerography.

Polymeric compositions, e.g., block copolymers, that are highly functional, preferably having high acid functionality, as well as a high molecular weight, but which do not readily gel would be highly desirable, particularly for the uses described above.

SUMMARY OF THE INVENTION

This invention is related to a polymeric composition comprising the reaction product of an A polymer which is an addition polymer having 3.5 or more reactive functional groups per polymer chain and a B polymer having about 2 to about 3 functional groups per polymer chain that are co-reactive with the reactive functional groups of the A polymer. Preferably, substantially all of the co-reactive functional groups of the B polymer are co-reacted. More, preferably, the reactive functional groups of the A polymer are condensation reactive functional groups.

Generally, the molar ratio of A polymer to B polymer is about 3:1 to about 2:1.7. Preferably when the B polymer is difunctional then the molar ratio of the A polymer to B polymer, based on the number average molecular weight (Mn) of the two polymers, is about 2:1 to about 2:1.7. When the B polymer is trifunctional then the preferable molar ratio of the A polymer to B polymer is about 3:1.

The condensation-reactive functional group is preferably selected from the group consisting of carboxyl, hydroxyl, epoxy, isocyanato, carboxyl anhydride, sulfo, esterified oxycarbonyl or amino. In a preferred embodiment, the A polymer has 3.5 or more carboxylic acid functional groups per polymer chain. Most preferably, this A polymer is a low molecular weight styrene/acrylic acid/α-methylstyrene polymer.

In another preferred embodiment, the A polymer has 3.5 or more hydroxyl functional groups per polymer chain. In this case, the A polymer is most preferably a low molecular weight styrene/2-ethylhexyl acrylate/2-hydroxyethyl methacrylate polymer.

Preferably, the B polymer is a condensation polymer selected from the group consisting of polyamide, polyester, epoxy, polyurethane, polyorganosiloxane and poly(ether). It is also preferable that the co-reactive functional groups of the B polymer are hydroxyl, epoxy, oxazolinyl or amino.

The polymeric compositions of this invention are high functional polymers with a relatively high molecular weight that are unexpectedly free of gelling or gel particles. These polymeric compositions have a broad molecular weight distribution which enhances their utility and performance characteristics.

Another embodiment of this invention is directed to the use of the polymeric compositions of this invention as 100% solids resin compositions. Such 100% solids resin compositions include, without limitation, powder coatings, plastics additives, hot-melt adhesives, 100% solids resin inks and the like. Yet another embodiment of this invention is directed to a method of reducing gloss of a film prepared from an acrylic epoxy hybrid powder coating by the inclusion of the solid resin composition of this invention in the powder coating.

DETAILED DESCRIPTION OF THE INVENTION

The A polymer of the polymeric composition of this invention is an addition polymer having 3.5 or more reactive functional groups per polymer. The preparation of functionalized addition polymers is well known to those skilled in the art.

Preferably, the reactive functional groups of the A polymer are condensation reactive functional groups. Preferred condensation-reactive functional groups include carboxyl, hydroxyl, epoxy, isocyanato, carboxyl anhydride, sulfo, esterified oxycarbonyl or amino. Carboxyl and hydroxyl functional groups are most preferred. Carboxyl anhydride means a divalent functional group represented by —C(=O)OC(=O)— in which both free valences are bonded or linked to the addition polymer backbone or a single valent radical represented by R—C(=O)OC(=O)— wherein R is an alkyl group having 1–30 carbon atoms, an aryl group having 6 to 20 carbon atoms, an aralkyl group having 7 to 20 carbon atoms or an alkyaryl group having 7 to 20 carbon atoms. Sulfo is the radical represented by —SO$_2$OH and esterified oxycarbonyl is an group represented by —C(=O)O—R wherein R has the same meaning as described above, e.g., alkyloxycarbonyl, aryloxycarbonyl, aralkyloxycarbonyl, or alkaryloxycarbonyl.

The addition polymer, which is the product of a chain-growth polymerization reaction, is prepared from ethylenically unsaturated monomers. These compounds are well known and include, for example, $C_2$ to $C_{20}$ alkenes, $C_3$ to $C_{20}$ alkadienes, $C_5$ to $C_{20}$ alkatrienes, $C_5$ to $C_{20}$ cycloolefins, vinyl substituted aromatics, acrylic or methacrylic acid, $C_1$ to $C_{20}$ alkyl esters of acrylic acid or methacrylic acid, $C_6$ to $C_{20}$ aryl esters of acrylic or methacrylic acid, $C_7$ to $C_{20}$ aralkyl esters of acrylic or methacrylic acid and the like.

More particularly, such ethylenically unsaturated monomers include, without limitation, ethylene, propylene, 1-butene, 2-butene, isobutene, 1-pentene, 2-methyl-2-butene, 1-hexene, 4-methyl-1-pentene, 3,3-dimethyl-1-butene, 2,4,4-trimethyl-1-pentene, 6-ethyl-1-hexene, 1-heptene, 1-octene, 1-decene, 1-dodecene, allene, butadiene, isoprene, chloroprene, 1,5-hexadiene, 1,3,5-hexatriene, divinylacetylene, cyclopentadiene, dicyclopentadiene, norbornene, norbornadiene, methylnorbornene, cyclohexene, styrene, alpha-chlorostyrene, alpha-methylstyrene, allylbenzene, phenylacetylene, 1-phenyl-1,3-butadiene, vinylnaphthalene, 4-methylstyrene, 4-methoxy-3-methylstyrene, 4-chlorostyrene, 3,4-dimethyl-alphamethylstyrene, 3-bromo-4-methyl-alpha-methylstyrene, 2,5-dichlorostyrene, 4-fluorostyrene, 3-iodostyrene, 4-cyanostyrene, 4-vinylbenzoic acid, 4-acetoxystyrene, 4-vinyl benzyl alcohol, 3-hydroxystyrene, 1,4-dihydroxystyrene, 3-nitrostyrene, 2-aminostyrene, 4-N,N-dimethylaminostyrene, 4-phenylstyrene, 4-chloro-1-vinylnaphthalene, acrylic acid, methacrylic acid, acrolein, methacrolein, acrylonitrile, methacrylonitrile, acrylamide, methacrylamide, methyl acrylate, methyl methacrylate, norbornenyl acrylate, norbornyl diacrylate, 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, allyl alcohol, propoxylated allyl alcohol, ethoxylated allyl alcohol, glycidyl acrylate, glycidyl methacrylate, 2-phenoxyethyl acrylate, trimethoxysilyloxypropyl acrylate, dicyclopentenyl acrylate, cyclohexyl acrylate, 2-tolyloxyethyl acrylate, N,N-dimethylacrylamide, isopropyl methacrylate, ethyl acrylate, methyl alpha-chloroacrylate, beta-dimethylaminoethyl methacrylate, N-methyl methacrylamide, ethyl methacrylate, 2-ethylhexyl acrylate, neopentyl glycol diacrylate, cyclohexyl methacrylate, hexyl methacrylate, 2-methylcyclohexyl methacrylate, beta-bromoethyl methacrylate, benzyl methacrylate, phenyl methacrylate, neopentyl methacrylate, butyl methacrylate, chloroacrylic acid, methyl chloroacrylic acid, hexyl acrylate, dodecyl acrylate, 3-methyl-1-butyl acrylate, 2-ethoxyethyl acrylate, phenyl acrylate, butoxyethoxyethyl acrylate, 2-methoxyethyl acrylate, isodecyl acrylate, pentaerythritol triacrylate, methoxy poly(ethyleneoxy)$_{12}$acrylate, tridecoxy poly(ethyleneoxy)$_{12}$ acrylate, chloroacrylonitrile, dichloroisopropyl acrylate, ethacrylonitrile, N-phenyl acrylamide, N,N-diethylacrylamide, N-cyclohexyl acrylamide, vinyl chloride, vinylidene chloride, vinylidene cyanide, vinyl fluoride, vinylidene fluoride, trichloroethane, vinyl acetate, vinyl propionate, vinyl butyrate, vinyl benzoate, vinyl butyral, vinyl chloroacetate, isopropenyl acetate, vinyl formate, vinyl methoxyacetate, vinyl caproate, vinyl oleate, vinyl adipate, methyl vinyl ketone, methyl isopropenyl ketone, methyl alpha-chlorovinyl ketone, ethyl vinyl ketone, hydroxymethyl vinyl ketone, chloromethyl vinyl ketone, allylidene diacetate, methyl vinyl ether, isopropyl vinyl ether, butyl vinyl ethers, 2-ethylhexyl vinyl ether, 2-methoxyethyl vinyl ether, 2-chloroethyl vinyl ether, methoxyethoxy ethyl vinyl ether, hydroxyethyl vinyl ether, aminoethyl vinyl ether, alpha-methylvinyl methyl ether, divinyl ether, divinylether of ethylene glycol or diethylene glycol or triethanolamine cyclohexyl vinyl ether, benzyl vinyl ether, phenethyl vinyl ether, cresyl vinyl ether, hydroxyphenyl vinyl ether, chlorophenyl vinyl ether, naphthyl vinyl ether, dimethyl maleate, diethyl maleate, di(2-ethylhexyl) maleate, maleic anhydride, dimethyl fumarate, dipropyl fumarate, diamyl fumarate, vinyl ethyl sulfide, divinyl sulfide, vinyl p-tolyl sulfide, divinyl sulfone, vinyl ethyl sulfone, vinyl ethyl sulfoxide, vinyl sulfonic acid, sodium vinyl sulfoate, vinyl sulfonamide, vinyl benzamide, vinyl pyridine, N-vinyl pyrollidone, N-vinyl carbazole, N-(vinyl benzyl)-pyrrolidine, N-(vinyl benzyl) piperidine, 1-vinyl pyrene, 2 isopropenyl furan, 2-vinyl dibenzofuran, 2-methyl-5-vinyl pyridine, 3-isopropenyl pyridine, 2-vinyl piperidine, 2-vinyl quinoline, 2-vinyl benzoxazole, 4-methyl-5-vinyl thiazole, vinyl thiophene, 2-isopropenyl thiophene, indene, coumarone, 1-chloroethyl vinyl sulfide, vinyl 2-ethoxyethyl sulfide, vinyl phenyl sulfide, vinyl 2-naphthyl sulfide, allyl mercaptan, divinyl sulfoxide, vinyl phenyl sulfoxide, vinyl chlorophenyl sulfoxide, methyl vinyl sulfonate, vinyl sulfoanilide, unblocked and blocked acetoacetoxy functional monomers (e.g., acetoacetoxyethyl methacrylate and acetoacetoxyethyl acrylate), unblocked and blocked meta-tetramethylisocyante, unblocked and blocked isocyanto ethyl methacrylate and the like.

At least one of the ethylenically unsaturated monomeric units of the addition polymer must have a reactive functional group such as a condensation reactive functional group, preferably a carboxyl group, hydroxyl group, or epoxy group, most preferably a carboxyl group or hydroxyl group. Exemplary acid-functional ethylenically unsaturated monomers include but are not limited to aconitic acid, acrylic acid, beta-carboxymethyl acrylate, cinnamic acid, crotonic acid, fumaric acid, itaconic acid, maleic acid, methacrylic acid, and mixtures thereof. Also suitable are certain monomers that are said to contain so-called "latent" acid moieties, such as cyclic anhydrides. Accordingly, a suitable cyclic anhydrides include but are not limited to itaconic anhydrides, maleic anhydride, and mixtures thereof. Monomers of acrylic or methacrylic acid are most preferred. The condensation reactive functional group is preferably a part of the ethylenically unsaturated monomer, although it may, if desired, be added to the addition polymer after formation of the polymer.

Preferably, the addition polymer used as the A polymer in the present invention is an acrylic copolymer or a styrene/acrylic acid or styrene/(meth)acrylic acid copolymer, more preferably a styrene/a-methylstyrene/acrylic acid copolymer. Generally, the preferred styrene/acrylic acid addition polymer is comprised of from 10 to 90% w/w styrene, and 10 to 90% w/w acrylic acid. The styrene may be replaced or admixed with a-methyl styrene if desired. As used herein "% w/w" is percent by weight of the total polymer weight unless stated to the contrary. Another preferred addition polymer used as the A polymer is a hydroxy acrylate or methacrylate copolymer or a styrene/hydroxy acrylate or styrene/hydroxy methacrylate copolymer, more preferably a styrene/hydroxy acrylate (or methacrylate)/acrylate (or methacrylate) copolymer.

Yet another addition polymer that may be employed as the A polymer in the polymeric composition of this invention are hyperbranched polymers such as disclosed in copending U.S. patent application Ser. No. 08/906,140, filed Aug. 5, 1997, now U.S. Pat. No. 5,986,020, issued on Nov. 16, 1999, entitled "Process for Producing Hyperbranched Polymers", the disclosure of which is incorporated by reference herein. Such hyperbranched polymers having terminal ethylenic unsaturation would preferably have 3.5 of more condensation reactive functional groups per hyperbranched polymer.

Typically the addition polymer is a low molecular weight polymer between about 500 to about 50,000 Mn, preferably about 900 to about 3,000 Mn. As noted previously, the condensation-reactive functionality of the addition polymer must be at least 3.5 or greater, and is preferably between about 3.5 and about 20, most preferably between about 3.5 and about 10.

The preparation of addition polymers is well known to those skilled in the art, and includes gas phase polymerization, solution polymerization, batch polymerization, continuous reactor or tube polymerization, suspension polymerization and emulsion polymerization. Methods of preparing such addition polymers are described in U.S. Pat. Nos. 4,413,370, 4,529,787 and 4,546,160, the disclosure of each of which is incorporated by reference herein.

The B polymer of the polymeric compositions of this invention has about 2 to about 3 functional groups that are co-reactive with the reactive functional groups of the A polymer. The preferred functional groups of the B polymer include: hydroxyl, carboxyl, epoxy, oxazolinyl and amino groups, although any group that is co-reactive with the reactive functional group of the A polymer is contemplated within the scope of this invention. The B polymer may be an addition polymer or condensation polymer, but preferably is a condensation polymer. The condensation polymer may be a polyamide, polyester, poly(ether), polyurethane or the like. The preparation of condensation polymers, like that of addition polymers, is well known to those skilled in the art. For example, polyesters may be prepared using common techniques of fusion processes with a glycol excess along with a tin catalyst. Polyamides may be readily prepared using a fusion process, without catalysis.

The preparation of polyesters or polyamides generally requires the use of polycarboxylic acids. Exemplary polycarboxylic acids include, without limitation, adipic, azelaic, benzophenone tetracarboxylic dianhydride, 1,4-cyclohexane dicarboxylate, chlorendic anhydride, dimer acids, fumaric acid, glutaric acid, hexahydrophthalic anhydride, itaconic acid, isophthalic acid, maleic acid or anhydride, phthalic anhydride, sebacic acid, suberic acid, succinic acid, terephthalic acid, tetrahydrophthalic anhydride, trimellitic anhydride, alkanyl succinic anhydride, 5-sodiosulfoisophthalic acid, or 5-lithiosulfoisophthalic acid. Generally, the preparation of polyester glycols will employ components such as 1,3-butanediol, 1,4-butanediol, cyclohexanedimethanol, diethylene glycol, dipropylene glycol, 2,2-dimethyl-1,3-pentane diol, 2-butyl-2-ethyl-1,3-propane diol, ethylene glycol, propylene glycol, pentaerythritol, trimethylol ethane, trimethylol propane, tris (hydroxy ethyl)isocyanurate, 1,6-hexanediol, 1,5-pentanediol, triethylene glycol, tetraethylene glycol, hydrogenated Bisphenol A, glycerin, 2 methyl-1,3-propane diol or the like.

In the preparation of polyamides, the polyamine functional components typically may be chosen from ethylene diamine, hexamethylene diamine, 2-methyl-1,5 pentane diamine, isophorone diamine, methylene dicyclohexyl amine, trimethyl hexamethylene diamine or the like.

The starting acids are polymerized fatty acids, which are mixtures of monobasic acids (C18), dibasic fatty acids (C36) and trimer or polybasic fatty acids (C54 or higher), dicarboxylic acids including aliphatic, cycloaliphatic, and aromatic dicarboxylic acids such as oxalic, glutaric, malonic, adipic, succinic, sebacic, azelaic, suberic, pimelic, terephthalic, 1,4 or 1,3-cyclohexane, naphthalene, phthalic, isophthalic, dodecanedioic dicarboxylic acids. Preferred dicarboxylic acids are straight chain aliphatic diacids having at least 6 carbon atoms and more preferably 6 to about 22 carbon atoms such as sebacic, dodecanedioic, and azelaic dicarboxylic acids. Mono carboxylic acids may be added to control the molecular weight. Preferred monocarboxylic acids are linear and have 2 to 22 carbon atoms. Most preferred are stearic and oleic acids.

The diamines used in the preparation of the polyamide may be one or more of the known aliphatic, cycloaliphatic or aromatic diamines having from about 2 to about 20 carbon atoms. Preferred are the alkylene diamines such as ethylene diamine, 1,3-diaminopropane, 1,4-diaminobutane, p-xylene diamine, 1,6-hexamethylene diamine, cyclohexyl amine, bis(4-cyclohexylamine)methane, 2,2'-bis(4-cyclohexylamine)propane, polyglycol diamines, isophorone diamine, m-xylene diamine, cyclohexylbis(methylamines), polyoxyalkylenediamine (sold by Huntsman under the trade name Jeffamine), 2-methyl-1,5-pentane diamine, 1,4-bis-(2-aminoethyl)benzene, dimer diamine, polyether diamines, methylpentamethylene diamine, and piperazine. The preferred diamines are straight chained aliphatic diamines of 2 to about 20 carbon atoms, especially ethylene diamine and hexamethylene diamine, and cycloaliphatic diamines, especially 4-4'-methylenebis(cyclohexylamine) and piperazine. Mono amines may be added to control the molecular weight. Preferred mono amines are linear and have 2 to 22 carbon atoms. Most preferred are stearyl and oleyl amines.

The condensation polymers may also include mono functional compounds to control functionality. For example, a mono acid such as benzoic acid, p-tertbutyl benzoic acid, veratic acid, rosin, lauric acid, fatty acids such as those made from soya, linseed, tall and dehydrated castor oils may be employed in the preparation of polyesters while mono amines such as stearyl amine, tallow amine and cyclohexyl amine may be employed in the preparation of polyamides.

Preferred polyamide compositions employ nylon type monomers such as adipic acid and 2-methyl-1,5-pentane diamine or dimer acid based monomers using dimer acid with isophorone diamine. Preferred polyester monomers include isophthalic acids and cyclohexyl dicarboxylates along with common glycols such as 3-methyl-1,3-propanediol, 2,2-dimethyl-1,3-propanediol, and cyclohexane dimethylol.

The polymeric compositions of this invention may be prepared by the polymerization of the previously described A and B polymers at a reaction temperate and for a time sufficient to form the polymeric composition. Preferably the reaction is a step growth polymerization reaction, i.e., a condensation polymerization reaction. Yet another embodiment of this invention is directed to the process of preparing the polymeric composition by reacting an A polymer which is an addition polymer having 3.5 or more reactive functional groups (preferably condensation reactive functional groups) per polymer chain with a B polymer having about 2 to about 3 functional groups per polymer chain that are co-reactive with the reactive functional groups of the A polymer. Preferably the reaction is conducted at a temperature and for a time sufficient to form the polymeric compositions by reacting substantially all the co-reactive functionality on the B polymer. Preferably, when the B polymer is difunctional, then the molar ratio of A polymer blended with the B polymer is about 2:1 to about 2:1.7. When the B polymer is trifunctional, then the molar ratio of A polymer blended with B polymer is preferably about 3:1. The preferred blending ratio when a mixture of difunctional and trifunctional B polymer is employed can be readily ascertained by those skilled in the art.

The temperature and time of the reaction will depend on the A and B polymers. For example, if condensation of A and B is by esterification then the reaction temperature may reach 240° C. or higher, while if condensation is through the formation of urethane linkages, then room temperature may be all that is necessary. The reaction temperature of the process for preparing the polymeric compositions is generally between about −50° C. to about 300° C., preferably from about 150° C. to about 240° C. The reaction temperature should not exceed the decomposition temperature of either the A polymer or the B polymer. Typically the reaction temperature is maintained from 0.5 to about 6 hours.

If desired, solvents and catalysts may be employed in the preparation of the polymeric composition of this invention. The use of such solvents and catalysts is well known to those of ordinary skill in the art. It is important that the A and B polymers be compatible with each other to provide adequate mixing. If the polymers are not compatible, then solvent or staged addition of the polymers may be employed to overcome this. Solvents that are well known to those skilled in the art are also useful in controlling viscosity and permitting appropriate mixing when high temperatures can not be used. In addition, small amounts of solvent may be used for products of reaction such as xylene to azeotrope off water.

The molecular weight of the polymeric compositions of this invention are generally broad. Both high weight average molecular weight (Mw) and z-average molecular weight (Mz) are possible, while the number average molecular weight (Mn) is typically not as high. The polymeric compositions of this invention are preferably high molecular weight polymeric compositions prepared from low molecular weight polymers in the substantial absence of gel. Without being bound to the theory, it is believed that the functionality of the reacting polymers is responsible for the absence of gel.

The resulting polymeric compositions of this invention may take the form of block copolymer, e.g. ABA block copolymers. However, the polymeric compositions of this invention are not restricted to block copolymers, but may result, for example in highly branched or complex polymers that may not be considered block copolymers.

Generally, the weight average molecular weight of the polymeric compositions of this invention range from about 4,000 to about 250,000, more preferably between about 5,000 to about 50,000 as measured by gel permeation chromatography using polystyrene standards. In addition, the preferred polymeric compositions having acid functionality typically have an acid number between about 40 to about 200. As will be apparent to one of ordinary skill in the art, the glass transition temperature (Tg) of the polymeric compositions of this invention can be readily varied by altering the monomeric make up of the A and B polymers. Typically the average Tg is −50° C. to 120° C., although the end use generally dictates the type of Tg that will be sought.

Industrial Applicability

This invention is related to the preparation of industrially useful polymeric compositions. The polymeric compositions of this invention may provide improved properties over those exhibited by the A or B polymers alone or blends of the A and B polymers. The polymeric compositions of this invention may be used neat, in solvent, in water or, with appropriate levels of residual functional groups such as carboxyl groups, as polymeric supports for emulsion polymers, any of which may be useful as components of coatings, e.g. overprint varnishes or floor finishes, pigment dispersions, inks, adhesives or emulsion polymers.

The polymeric compositions of this invention may also be used as plastic additives. Thus, yet another embodiment of this invention is directed to a method of compatabilizing one or more plastics by the addition of a compatabilizing amount of the polymeric composition of this invention thereto. The polymeric compositions of this invention may also be employed in a method of adhering two or more substrates by the application of the polymeric compositions to at least one surface of at least one substrate and joining the surface to a surface of a second substrate. The polymeric compositions may also be used as 100% solids resins.

There may be used, for example, as powder coating compositions, hot melt adhesives, plastics additives, solid resin inks, for xerography and the like. Other related uses of the polymeric composition of this invention will be readily apparent to those of ordinary skill in the art.

The powder coating composition of this invention comprises at least one polymeric composition as described herein, optionally a colorant or pigment optionally a cross-linking agent and , optionally. Preferably the pigment and cross-linking agent are present. Such colorants and cross-linking agents are readily available and known to those of ordinary skill in the art, as is their application in powder coating compositions. The powder coating composition of this invention may also include wetting agents, defoamers, UV absorbers, antioxidants and the like.

100% solids resin inks of this invention comprise the polymeric composition as described herein and a colorant or pigment. The colorant or pigments that are useful in the 100% solids resin inks of this invention are well known to those of ordinary skill in the art, as is their application in 100% solids resin inks. The 100% solids resin ink of this invention may be used by application of the resin to a substrate and melting said resin thereon. A particular use of such inks includes xerography.

This invention will be better understood from the Experimental Details which follow. However, one skilled in the art will readily appreciate that the specific methods and results discussed are merely illustrative of the invention and no limitation of the invention is implied.

Experimental Details

"A" Polymers

Preparation of Styrene/α-Methylstyrene/Acrylic Acid Resins Having Carboxylic Acid Functionality "A" Polymer (1)

A low molecular weight styrene/α-Methylstyrene/acrylic acid resin was prepared by polymerizing 22% styrene, 45% α-methyl styrene and 33% acrylic acid in 20% xylene with 3 mole per cent initiator at 490° F. (254°) in a continuous stirred tank reactor (CSTR) with a 12 min. residence time, followed by stripping out the solvent and any unreacted monomers.

The resulting styrene/α-methylstyrene/acrylic acid resin had a number average molecular weight (Mn), a weight average molecular weight (Mw), and a z average molecular weight (Mz) of 1170, 1770 and 2590, respectively. The number average carboxylic acid functionality (Fn), the weight average carboxylic acid functionality (Fw), the acid number (solid), the glass transition temperature (Tg) (onset and midpoint) of the polymer are set forth in Table 1.

"A" Polymers (2–4)

Styrene/α-methylstyrene/acrylic acid resins were prepared in a manner similar to A Polymer 1. The components and characteristics of those resins, as well as those of A Polymer 1 are set forth in Table 1.

Preparation of a Hydroxy Functional Acrylic

"A" Polymer (5)

Methylmethacrylate (27%), butyl acrylate (15%) and 2-hydroxy ethyl acrylate (58%) were dissolved in 20% butyl acetate and were polymerized at 450° F. for 15 minutes under in the manner substantially similar to that described in U.S. Pat. No. 4,546,160. The reaction product was then reduced to 51% solids in ethyl diglyme. The resulting hydroxy functional acrylic had a number average molecular weight of 1180 and a hydroxy functionality per chain of 5.28

TABLE 1

| A Polymer | % STY/AMA/AA | Mn | Mw | Mz | Fn | Fw | Acid Number | Tg (onset/midpoint) |
|---|---|---|---|---|---|---|---|---|
| 1 | 22/45/33 | 1060 | 1607 | 2360 | 5.08 | 7.71 | 267 | 75/81 |
| 2 | 22/45/33 | 1180 | 1810 | 2700 | 5.72 | 8.78 | 266 | 79/85 |
| 3 | 13/55/32 | 988 | 1459 | 2124 | 4.74 |  | 265 | 77/85 |
| 4 | 22/45/33 | 1003 | 1512 | 2231 | 4.72 | 7.12 | 264 | 73/83 |

STY - styrene
AMS - α - methylstyrene
AA - acrylic acid

"B" Polymers

Preparation of Polyester Polymers

"B" Polymer (1)

A polyester was prepared by charging 2-methyl-1,3-propane diol (43.06 parts; 21.53 lbs; 9.77 kgs), isophthalic acid (47.65 parts; 23.83 lbs; 10.81 kgs) and Fascat 4100 (a tin catalyst available from Elf atochem chemical) (0.08 parts; 0.04 lbs; 0.20 kgs) to a reactor with a nitrogen atmosphere. The charge was heated to 210° C. while maintaining the top of the column at 100° C. or less. The reaction was held until the acid number was less than 5, then cooled to 150° C. and held overnight. The following day the reaction contents were reheated to 150° C. followed by the addition of 1,4-cyclohexane dicarboxylate (24.69 parts; 12.35 lbs; 5.60 kgs) and Fascat 4100 (0.02 parts; 0.01 lbs; 0.005 kgs) to the reactor contents. The reactor contents were then heated to 220° C. while maintaining a nitrogen blanket. The top of the column was held at 100° C. or less and the reaction was held to an acid value of 5 or less was reached. The resulting polyester resin had a number average molecular weight of (Mn) 3023, weight average molecular weight (Mw) of 6486 and a z average molecular weight (Mz) of 10,720. The Tg was determined to be 8° C. at onset and 14° C. at midpoint.

"B" Polymers (2–6)

Polyester resins were prepared in a manner similar to B Polymer 1 with the exception that the components of the polyester and/or the mole ratio of the components differed. The components, mole ratio, Mn, Mw, Mz and Tg (onset/midpoint) of the B polyesters (1–6) are set forth in Table 2 below.

TABLE 2

| B Po-lymer | Composition | Mole Ratio | Mn | Mw | Mz | Tg ° C. (onset/mid-point) |
|---|---|---|---|---|---|---|
| 1 | MpDiol/Isophthalic Acid/CHDA | 10/6/3 | 3023 | 6486 | 10720 | 8/14 |
| 2 | Esterdiol 204/Isophthalic Acid | 4/3 | 1294 | 1975 | 2893 | 1/6 |
| 3 | CHDM/Azeleic Acid | 7/6 | 2695 | 5756 | 9556 | −48/−42 |
| 4 | Neopentyl Glycol/Maleic Anhydride/Adipic Acid | 13/3/9 | 2432 | 4851 | 8347 | −40/−37 |
| 5 | Esterdiol 204/CHDM/Isophthalic Acid | 5/3/7 | 2332 | 4452 | 7055 | 25/31 |
| 6 | Same As above (5% excess glycol) | 5/3/7 | 2427 | 4442 | 6958 | 24/29 |

CHDA - 1,4-cyclohexane dicarboxylic acid
CHDM - 1,4-cyclohexane dimethanol
MpDiol - 2-methyl-1,3-propane diol available from ARCO Chemical, Newton Square, PA
Esterdiol 204 - available from Union Carbide, Danbury, CT.

Preparation of Polyamide Resins

"B" Polymer (7)

Sylvodym® T-18 dimer acid ($C_{36}$ dimer acid available from Arizona Chemical) (77.198 parts), Kemamine® P-990D (Stearyl amine available from Witco Chemical) (4.150 parts) and Dow Corning 200 (a silicone defoamer) (0.002 parts) were charged to a reactor and heated to 130° C. under a nitrogen atmosphere. Next, a mixture of isophorone diamine (16.140 parts) and Dytek® A (available from E.I. DuPont de Nemours) (2-methyl-1,5-pentane diamine) (7.340 parts) was added to the reaction mixture while holding the temperature between 130 and 135° C. While under a nitrogen purge, the reaction mixture was slowly heated to about 220° C. and the temperature held until substantially all the theoretical water was removed. An amine functional polyamide resin was obtained. Mn=3160 (theoretical); Base value=31; Tg=6/12° C.

"B" Polymer (8)

Sylvodym® T-18 dimer acid (76.598 parts), cyclohexyl amine (1.500 parts) and Dow Corning 200 (0.002 parts) were charged to a reactor and heated to 130° C. Next, isophorone diamine (26.700 parts) was added to the reactor while holding the temperature between 130 to 135° C. The reaction mixture was then slowly heated to 220° C. using a nitrogen sparge to remove the water. The reaction temperature was held until substantially all of the water was removed and the polyamide was recovered. Mn=3184 (theoretical); Base value=29.; Tg=29/38° C.

Preparation of a Polyurethane B Polymer

"B" Polymer (9)

Ethyl diglyme (EDG) (600.3 g) and 2-methyl-1,3-propanediol (MPD) (146.4 g) were added to a 2 Liter 4-necked reaction flask. The flask was equipped with an agitator, $N_2$ inlet, thermocouple and condenser with a trap to collect water. The mixture was heated to 150° C. under nitrogen to remove any excess water or solvent impurities. After approximately 1 hour the reaction was allowed to cool to 30° C. and the nitrogen was removed. Tetramethylxylenediisocyanate (TMXDI)(454.2 g) was then added to the reaction mixture through an addition funnel at a rate of approximately 1 drop per second for a 3 hour period during which the reaction temperature was maintained at 80° C. A polyurethane oligomer was recovered. Mn=2582 (theoretical).

Preparation of Polymeric Compositions

EXAMPLE 1

A polyester resin, B polymer (1), (963.0 g) was added to a reaction flask and heated to 150° C. The A polymer (1), a styrene/α-methylstyrene/acrylic acid resin, (541.7 g) was gradually added over 15 minutes followed by the addition of xylene (45 g). The trap was filled with xylene to keep 3% xylene in the reaction flask while heating the reaction mixture to 230° C. to draw off water. The reaction was conducted for 6.5 hours. The resulting polymeric compositions had an Mw of 26,180, an Mn of 3,444, an Mz of 109,700 and a Tg of 25/36° C. (onset/midpoint).

EXAMPLES 2–11

Various polymeric compositions were prepared from an A polymer of a styrene/α-methylstyrene/acrylic acid resin and a B polymer of a polyester resin in a manner similar to Example 1. The components and various characteristics of those polymeric compositions are set forth in Table 3 below.

TABLE 3

| Example | A Polymer | B Polymer | Mole Ratio B/A | % B | Acid Number | Mn | Mw | Mz | Tg °C. Onset/mp |
|---|---|---|---|---|---|---|---|---|---|
| 2 | 3 | 2 | 1/2 | 40 | 140 | 1655 | 4261 | 9619 | 40/51 |
| 3 | 1 | 3 | 1/2 | 48 | 116 | 2618 | 16770 | 62610 | 5/17 |
| 4 | 1 | 4 | 1/2 | 55 | 116 | 2824 | 95260 | 864200 | -2/8 |
| 5 | 1 | 5 | 1.2/2 | 58 | 102 | 2345 | 8378 | 20450 | 47/56 |
| 6 | 1 | 6 | 1.2/2 | 58 | 93 | 2723 | 11550 | 33320 | 48/56 |
| 7 | 1 | 1 | 1/2 | 59 | 102 | 2715 | 20440 | 91990 | 40/45 |
| 8 | 1 | 1 | 1.25/2 | 65 | 72 | 3719 | 36310 | 382800 | 22/27 |
| 9 | 2 | 1 | 1.25/2 | 62 | 83 | 3008 | 23000 | 102900 | 31/40 |
| 10 | 2 | 1 | 1.4/2 | 65 | 72 | 3845 | 44700 | 234800 | 21/31 |
| 11 | 2 | 1 | 1.62/2 | 69 | 62 | 4327 | 139300 | 4015000 | 19/28 |
| 12 | 1 | ‡ | 1/3 | 34 | 148 | 2318 | 207000 | 2327000 | 3/19 |

‡ Tone 1320 triol - a polycaprolactone polyol available from Union Carbide, Danbury, CT.
mp - midpoint.

EXAMPLE 13

A polymeric composition was prepared from the A polymer (5), a hydroxy functional acrylic, and the B polymer (9), a polyurethane oligomer. To a one liter 4-necked reaction flask equipped with a nitrogen inlet, condenser, agitator and thermocouple was added 263.7 g of B polymer (9). Then 6 drops of dibutyl tin dilaurate (DBTDL) was charged to the flask. The solution was preheated to 70° C., after which the A polymer (5) was slowly added dropwise to the reaction. After all the A polymer (5) had been added, the temperature of the reaction was increased to 85° C. and allowed to react for about 4.5 hours. The resulting solution had a deep yellow color. Mn=2646; Mw=6411; Mz=17290; OH Value=58.

EXAMPLE 14

A polymeric composition was prepared from the A polymer (4), i.e., a styrene/acrylic resin and B Polymer (8), a polyamide resin. The A polymer resin (38.85 parts) was charged to a reactor and then heated to 180° C. with agitation under nitrogen. This was followed by the addition of the B polymer (8) (61.85 parts) at 180° C. The mixture was then heated to 220° C. and held until the water was removed. The temperature was then raised to 230° C. and the polymeric composition was collected. Mn=2799; Mw=26990; Mz=93660; Tg=42/62° C.; AV=80.

EXAMPLE 15

A polymeric composition was prepared in a manner similar to Example 14, except that the styrene/acrylic resin, i.e., the A polymer was 39.03 parts and the B polymer was B polymer (7). Mn=2939; Mw=24,300; Mz=87,920; Tg=30/46° C.; AV=38.

EXAMPLE 16

A polymeric composition was prepared from A polymer (4) and a B polymer of polypropylene oxide (PPO 425 available from Dow Chemical, Midland, Mich.) having a number average molecular weight (Mn) of 639 and a functionality of 2 hydroxy groups per mole. The A polymer and B polymer were reacted at a molar ratio of 2 to 1 in the absence of a solvent and catalyst at a temperature of about 210 to 238° C. to form the desired polymeric composition. The resulting polymeric composition had a Mn of 1688, a Mw of 5945, a Mz of 17,120, an acid number (solid) of 164 and a Tg of 45/55° C. (onset/midpoint).

EXAMPLE 17

A polymeric composition was prepared in a manner similar to Example 16, except the B polymer was a polypropylene oxide (PPO 1000 available from Dow Chemical) having a number average molecular weight (Mn) of 1256. The functionality of the B polymer was 2 hydroxy groups per mole and the block copolymer synthesis temperature ranged from about 215 to 234° C. The resulting polymeric composition had a Mn of 1861, a Mw of 8251, a Mz of 24510, an acid number (solid) of 131 and a Tg of -2/10° C. (onset/midpoint).

EXAMPLE 18

A polymeric composition was prepared in a manner similar to Example 16, except the B polymer was a polypropylene oxide (PPO 4000 available from Dow Chemical) having a number average molecular weight of 3479. The functionality of the B polymer was 2 hydroxy groups per mole. The polymeric composition synthesis temperature ranged from about 220 to 240° C. and toluene was employed as a solvent. The resulting polymeric composition had a Mn of 2520, a Mw of 17,340, a Mz of 45,190, an acid number (solid) of 62.89 and a Tg of -54/-46° C. (onset/midpoint).

EXAMPLE 19

A polymeric composition was prepared in a manner similar to Example 16, except the B polymer was a poly (ethylene oxide) (PEO 200 available from Dow Chemical) having a number average molecular weight of 377. The functionality of the B polymer was 2 hydroxy groups per mole. The polymeric composition synthesis temperature was between about 200 to 220° C. The resulting polymeric composition had a Mn of 1601, a Mw of 5219, a Mz of 15350, an acid number (solid) of 180.8 and a Tg of 59/67° C. (onset/midpoint).

EXAMPLE 20

A polymeric composition was prepared in a manner similar to Example 16, except the B polymer was a poly (ethylene oxide) (PEO 600 available from Dow Chemical) having a number average molecular weight of 882. The functionality of the B polymer was 2 hydroxy groups per mole. The polymeric composition was prepared at a synthesis temperature between about 200 to 220° C. The resulting polymeric composition had a Mn of 1819, a Mw of 6784, a Mz of 17,730, an acid number (solid) of 156.7 and as Tg of 18/27° C. (onset/midpoint).

EXAMPLE 21

A polymeric composition was prepared in a manner similar to Example 16, except the B polymer was a poly (propylene-β-ethylene oxide) (Pluronic 123, available from BASF) having a number average molecular weight of 4333. The functionality of the B polymer was about 2 hydroxy groups per mole. The polymeric composition synthesis temperature was between about 200 to about 230° C. The resulting polymeric composition had a Mn of 3074, a Mw of 23,710, a Mz of 46,970, an acid number (solid) of 50.2 and a Tg of −61/−53° C. (onset/midpoint).

A number of additional polymeric composition were prepared using the A polymers described in Table A and the B polymers described in Table B below.

TABLE A

| A Polymer | Composition | Functionality | AV* | Mn | Mw | Tg | FN |
|---|---|---|---|---|---|---|---|
| I | Styrene Acrylic[a] | carboxyl | 277 | 923 | 1637 | 45 | 4.56 |
| II | Styrene Acrylic[b] | carboxyl | 269 | 1116 | 1779 | 67 | 5.35 |
| III | STY/AA | carboxyl | 289 | 1000 | 1526 | 65 | 5.15 |
| IV | STY/AMS/AA | carboxyl | 264 | 1003 | 1512 | 71 | 4.72 |
| V | MMA/AA | carboxyl | 339 | 1121 | 1753 | 36 | 6.77 |
| VI | C-14 α-olefin MA$_n$ | anhydride | — | 2327 | — | — | 7.9 |
| VII | STY/MMA/GMA | epoxy | — | 2200 | — | — | 3.8 |
| VIII | Acrylic[c] | hydroxy | — | 1400 | — | — | 3.5 |
| IX | MMA/BA/HEA | hydroxy | — | 1180 | — | — | 5.28 |

[a]Joncryl 682 available from S C Johnson Polymer, Sturtevant, Wisconsin
[b]Morez 300 available from Morton International, Chicago, Illinois
[c]Joncryl 569 available from S C Johnson Polymer
Acid Value based on polymer solids
STY - styrene; AA - acrylic acid; AMS - α-methylstyrene; MMA - methylmethacrylate; MA$_n$ - maleic anhydride; GMA - glycidyl methacrylate; BA - butyl acrylate; HEA - hydroxyethylacrylate

TABLE B

| B Polymer | Composition | Functionality | Mn | FN |
|---|---|---|---|---|
| I | Linear Polyester[a] | 1° Hydroxyl | 1000 | 2 |
| II | Branched Polyester[b] | 1° Hydroxyl | 900 | 3 |
| III | Linear Polyester | carboxyl | 1700 | 2 |
| IV | Linear Polyurethane | Isocyanato | 2500 | 2 |
| V | Linear Dimer Acid Polyamide | 1° Amino | 4028 | 2 |
| VI | Linear Dimer Acid Polyamide | Oxazolinyl | 3776 | 2 |
| VII | Linear Adipic Acid Nylon | 1° Amino | 1020 | 2 |
| VIII | Linear Polypropylene glycol[c] | 2° Hydroxyl | 425 | 2 |
| IX | Epoxy Resin[d] | Epoxy | 600 | 2 |
| X | Polyether Diamine[e] | 1° Amino | 600 | 2 |

[a]Rucoflex 1015-120 ® available from RUCO Polymer Corp, Hicksville, New York
[b]Tone 0310 ® available from Union Carbide Corp., Danbury, Connecticut
[c]Polyglycol P425 ® available from Dow Chemical Co., Midland, Michigan
[d]EPON 836 ® available from Shell Chemical Co., Houston, Texas
[e]Jeffamine ED 600 ® available from Huntsman Corp., Houston, Texas

EXAMPLE I

Preparation of a Polymeric Composition by Bulk Thermal Process

A 1000 ml four necked flask equipped with a stirrer, a nitrogen sparge tube, and a Dean Stark trap fitted with a condenser reactor was charged with 468 g of a styrene acrylic polymer having carboxyl functionality (A polymer I). This was heated to melt at 150–180° C. Then 140.4 g of a branched polyester polymer having a primary (1°) hydroxyl (B polymer II) was added to achieve a mole ratio of 3A:1 B. The temperature was then raised to 220° C. and held till 8.4 g of water was removed. The product was then poured into a pan to cool. The final product is described in Table C.

EXAMPLES II–VI

A number of polymeric compositions were made in a manner substantially similar to Example I with a reaction temperature between 220–240° C. using A and B polymers as indicated in Table C below.

EXAMPLE VII

Preparation of a Polymeric Composition by a Solvent Reflux Process

A 1000 ml four necked flask equipped with a stirrer, a nitrogen sparge tube, and a Dean Stark trap fitted with a condenser was charged with 518.3 g with a methylmethacrylate polymer having carboxyl functionality (A polymer V). This was then heated to 150–180° C. to melt and agitation was started. Then 96.9 g of a linear polypropylene oxide having secondary (2°) hydroxyl functionality (B polymer VIII) and 13.6 g of methyl n-amyl ketone (MAK) were added. The reactor was then stage heated for 1 hour at 180° C., then one hour at 200° C. and finally one hour at 220° C. The product was then poured into a tray to cool. Using the water-MAK reflux, 10.6 g of water was removed.

EXAMPLES VIII and IX

Two polymeric compositions were made in a manner substantially similar to Example VII with the exception that MAK was replaced by xylene and the A and B polymers indicated in Table C were used.

EXAMPLE X

Preparation of a Polymeric Composition by a Solvent Process

A 1000 ml four necked flask equipped with a stirrer, a nitrogen blanket and a condenser was charged with 222.2 g of a solution of 50% of a styrene/acrylic acid polymer having carboxyl functionality (A polymer III) and 50% diethylene glycol diethyl ether. After agitation was started, 277.8 g of a solution of 50% of a linear polyurethane polymer having isocyanato functionality (B polymer IV) and 50% diethylene glycol diethyl ether was added. After mixing 5 minutes, 0.25 g of Metacure T12 available from Air Products catalyst was added and the temperature raised to 65° C. and held there for 4 hours. The product was then poured into a quart jar and cooled.

EXAMPLES XI–XIV

Several polymeric composition were prepared in a manner substantially similar to Example X with reaction temperatures ranging from 125° C. to 190° C. using A and B polymers as indicated in Table C below.

The A polymer and B polymer constituents and properties of the resulting polymeric compositions for Examples I–XIV are set forth in Table C below.

TABLE C

| Example No. | A Polymer | B Polymer | Mole Ratio A:B | Wt. % B | Mn | Mw | Mz | Tg | Onset Functionality At End |
|---|---|---|---|---|---|---|---|---|---|
| I | I | II | 3:1 | 23 | 1703 | 9566 | 36210 | 18 | 153 AV |
| II | I | I | 2:1 | 29 | 1751 | 7506 | 22840 | −6 | 143 AV |
| III | I | VI | 2:1 | 66 | 2087 | 8369 | 22420 | ND | 70 AV |
| IV | I | V | 2:1 | 71 | 2982 | 11810 | 22430 | ND | 55 AV |
| V | VIII | III | 2:1 | 38 | 2609 | 62120 | 1,714,000 | ND | ND |
| VI | IV | VII | 2:1 | 34 | ND | ND | ND | 76 | 140 AV |
| VII | V | VIII | 2:1 | 16 | 1699 | 5996 | 18760 | 26 | 250 AV |
| VIII | I | VIII | 2:1 | 18 | 1292 | 3194 | 6696 | 26 | 176 AV |
| IX | II | VIII | 2:1 | 16 | 1534 | 4401 | 11220 | 38 | 173 AV |
| X | III | IV | 2:1 | 56 | 1385 | 4228 | 9618 | ND | ND |
| XI | VII | III | 2:1 | 33 | 2288 | 5590 | 10150 | ND | ND |
| XII | IX | IV | 2:1 | 53 | 2646 | 6411 | 17290 | −29 | ND |
| XIII | VI | X | 2:1 | 12 | ND | ND | ND | ND | 300 AV |
| XIV | IV | IX | 2:1 | 24 | 1485 | 5609 | ND | ND | 155 AV |

ND = NOT DETERMINED; AV = acid value

Powder Coatings

As shown below, when the polymeric compositions of the present invention were added to acrylic epoxy hybrid powder coatings the resulting powder coatings exhibited advantageous characteristics. In particular, such powder coatings prepared with polymeric compositions comprised of PPO (polypropylene oxide) as the B component were advantageous. The powder coating of this invention demonstrated an unexpected unique property of reducing gloss yet maintaining complete coating flexibility. Other methods commonly used to lower gloss tend to compromise flexibility. Existing gloss reducing techniques used in powder coating processes are unable to maintain flexibility without causing detriment to some other film property. With the polymeric compositions of the present invention, gloss can be lowered without compromising flexibility, hardness, corrosion, and U.V. resistance.

Examples PC-1 to PC-5 were formualted with the polymeric compositions of this invention used as a modifier of an acrylic/epoxy hybrid coating powder. In addtion Comparative Exampels PC-CM-1 to PC-CM-5 were also prepared. The exemplary and comparative powder coatings are described in Tables D1 and D2, respectively, below.

TABLE D1

Polymeric Compositions as Modifiers for Powder Coatings

| Components | PC-1 | PC-2 | PC-3 | PC-4 | PC-5 |
|---|---|---|---|---|---|
| Polym. Comp. (Ex. 17) | 3.20 | | | | |
| Polym. Comp. (Ex. 16) | | 3.26 | | | |
| Polym. Comp. (Ex. VII) | | | 3.27 | 4.62 | 6.16 |
| SCX-819[1] | 26.98 | 26.18 | 26.18 | 24.06 | 21.60 |
| Shell 2002[2] | 31.32 | 32.05 | 32.03 | 32.81 | 33.71 |
| Modaflow III[3] | 1.01 | 1.01 | 1.00 | 1.00 | 1.00 |
| Benzoin | 0.30 | 0.30 | 0.30 | 0.30 | 0.30 |
| R-960[4] | 36.99 | 37.00 | 36.98 | 36.97 | 37.00 |
| NXJ-60[5] | 0.20 | 0.20 | 0.24 | 0.24 | 0.24 |
| Total Weight | 100 | 100 | 100 | 100 | 100 |

Testing

| | | | | | |
|---|---|---|---|---|---|
| Gloss 60 (deg) | 42 | 42 | 56 | 27 | 24 |
| Gloss 20 (deg) | 9 | 9 | 18 | 6 | 5 |
| Impact-D (in-lb) | 160 | 160 | 160 | 160 | 160 |
| Impact-R (in-lb) | 40 | 60 | 20 | 80 | 80 |
| Gel Time (secs) | 46 | 43 | — | — | — |

TABLE D2

Comparative Examples

| Components | PC-CM-1 | PC-CM-2 | PC-CM-3 | PC-CM-4 | PC-CM-5 |
|---|---|---|---|---|---|
| Polypropylene Oxide (Mn 425) | 0.50 | 0.75 | 0.49 | — | — |
| SCX-819[1] | 31.20 | 31.12 | 30.72 | 22.17 | 26.01 |
| Shell 2002[2] | 30.00 | 29.93 | 29.53 | 34.75 | 32.42 |
| Modaflow III[3] | 1.00 | 1.00 | 0.98 | 1.00 | 1.00 |
| Benzoin | 0.30 | 0.30 | 0.30 | 0.30 | 0.30 |
| R-960[4] | 36.80 | 36.70 | 36.23 | 36.94 | 37.02 |
| NXJ-60[5] | 0.20 | 0.20 | 0.20 | 0.25 | 0.25 |
| Resin L | — | — | 1.55 | — | — |
| Joncryl 682[6] | — | — | — | 4.59 | 3.00 |
| Total Weight | 100.00 | 100.00 | 100.00 | 100.00 | 100.00 |

Testing

| | | | | | |
|---|---|---|---|---|---|
| Gloss 60 (deg) | 90 | 90 | 71 | 29 | 73 |
| Gloss 20 (deg) | 63 | 60 | 32 | 6 | 35 |
| Impact-D (in-lb) | 160 | 160 | 50 | 80 | 160 |
| Impact-R (in-lb) | 40 | 30 | <10 | <10 | 40 |
| Gel Time (secs) | 54 | 53 | 53 | 45 | 44 |

[1]SCX-819 - acrylic resin available from Johnson Polymer, Inc., Sturtevant, Wisconsin.
[2]Shell 2002 - an epoxy resin available from Shell Oil Company, Houston, Texas.
[3]Modaflow III - flow agent available from Solutia, Inc., St. Louis, Missouri.
[4]R-960 - TiO$_2$ pigment available from DuPont de Nemours & Co., Wilmington, Delaware.
[5]NXJ-60 - catalyst available from Synthron, Morgantown, North Carolina.
[6]Joncryl 682 - an acrylic resin available form Johnson Polymer, Inc.
Resin L - a styrene acrylic resin similar to polymer A (1).

The powder coating compositions were prepared in the following manner: First, all resins were preground in a Vitamix blender to reduce the particle size. Next, all ingredients were weighed together into a bag and vigorously hand shaken to mix. The premixed powders were extruded on a Buss PLK-46 extruder at a zone 1 setting of 60° C., and a zone 2 setting of 110° C. The extrudate was flaked in chill rolls, and broken up with a mallet. The flake was ground using a Bantam mill, 0.027 screen, equipped with liquid nitrogen cooling. After grinding, the powder was sieved using a 140 mesh screen. The powder was applied to Bonderite 1000 panels at varied film builds, and cured for 20 minutes at 190° C.

The 60° and 20° gloss of the resulting coatings was measured using a Byk Chemie gloss meter. Impact was measured by direct "D" and reverse "R" impact techniques well known to those skilled in the art.

Use of the polymeric compositions of this invention in the acrylic epoxy hybrid powder coatings was found to degloss, yet maintain physical properties in the coatings. The results show that levels in excess of about 4% were preferred, although lower levels may be used.

The comparative examples (PC-CM-4 and PC-CM-5) made with only Joncryl 682 (an acrylic/styrene/α-methyl styrene resin available from Johnson Polymer, Inc., Sturtevant, Wis.) showed lower gloss but did not retain as much impact resistance, as the inventive compositions.

Examples (PC-CM-1 and PC-CM-2) made with only polypropylene oxide did not degloss the acrylic hybrid. The example (PC-CM-3) made with both polypropylene oxide, and a styrene acrylic resin (Resin L) added separately showed slightly lower gloss, and reduced impact resistance. The results show that the polymeric compositions of the present invention are useful for deglossing acrylic epoxy hybrid powder coatings, particularly those compositions having a polymeric composition with a high acid number.

The polymeric compositions of this invention were also used as a stand-alone binder for the preparation of powder coating compositions. Examples PC-6 to PC-9 are described below in Table E.

TABLE E

Polymeric Compositions In Powder Coatings

| Components | PC-6 | PC-7 | PC-8 | PC-9 |
|---|---|---|---|---|
| Polym. Comp. A | 28.94 | | | |
| Polym. Comp. B | | 27.74 | | |
| Polym. Comp. C | | | 31.51 | 31.48 |
| Shell 2002[2] | 32.56 | 33.77 | 29.97 | 29.94 |
| Modaflow III[3] | 1.01 | 1.01 | 1.00 | 1.00 |
| Benzoin | 0.30 | 0.30 | 0.30 | 0.30 |
| R-960[4] | 0.20 | 0.20 | 26.97 | 36.93 |
| NXJ-60[5] | 36.99 | 36.98 | 0.25 | 0.35 |
| Total Weight | 100.00 | 100.00 | 100.00 | 100.00 |
| Testing | | | | |
| Gloss 60 (deg) | 95 | 93 | 97 | 95 |
| Gloss 20 (deg) | 75 | 71 | 78 | 74 |
| Impact-D (in-lb) | 60 | 160 | 20 | 20 |
| Impact-R (in-lb) | <10 | <10 | <10 | <10 |
| Gel Time (secs) | 60 | 51 | 68 | 48 |

Polym. Comp. A. - A polymer Ex. 1 and B polymer of Esterdiol 204/CHDM/IPA with a molar ratio of 5/3/7 (42% Acrylic)
Polym. Comp. B. - A polymer Ex. 1 and B polymer of MPD/IPA/CHDA with a molar ratio of 10/6/3 (47% Acrylic)
Polym. Comp. C - A polymer I and B polymer of NPG/IPA/Adipic with a molar ratio of 12/8/3 (39% Acrylic)
CHDM - cyclohexane dimethanol; IPA-isophthalic acid; CHDA-cyclohexane dicarboxylic acid; NPG-neopentyl glycol; MPD-2-methyl-1,3-propane diol; Esterdiol 204 is a glycol available from Union Carbide, Danbury, Connecticut
SCX-819 - acrylic resin available from Johnson Polymer, Inc., Sturtevant, Wisconsin.
[2]Shell 2002 - an epoxy resin available from Shell Oil Company, Houston, Texas.
[3]Modaflow III - flow agent available from Solutia, Inc., St. Louis, Missouri.
[4]R-960 - $TiO_2$ pigment available from DuPont de Nemours & Co., Wilmington, Delaware.
[5]NXJ-60 - catalyst available from Synthron, Morgantown, North Carolina.

The results show that the polymeric compositions of this invention may be used in an epoxy hybrid powder coating composition as a stand alone binder. This is particularly surprising even with about 40% acrylic A polymer used in the polymer composition since it would be expected that a simple blend having that much acrylic A polymer would give very low gloss and very poor impact.

Adhesives

As previously discussed, the 100% solids resin polymeric composition of this invention may be used as a hot melt adhesive. The 100% solid resin adhesive compositions of the present invention were applied to the clay coated side of 18 point blister board. Tests of the coatings showed 100% fiber tear when the bond was pulled. A comparison polyester was so brittle that it would occasionally fracture when the bond was pulled.

Other variations and modifications of this invention will be obvious to those skilled in the art. This invention is not limited except as set forth in the following claims.

What is claimed is:

1. A powder coating composition comprising: (i) a substantially non-gelled polymeric composition that is the reaction product of an A polymer which is an addition polymer having 3.5 or more reactive functional groups per polymer chain and a B polymer having about 2 to about 3 functional groups per polymer chain that are co-reactive with said reactive functional groups of the A polymer; (ii) optionally a cross-linking agent; (iii) optionally a colorant; and (iv) optionally an epoxy resin, wherein substantially all of the co-reactive functional groups of the B polymer have been co-reacted and a molar ratio of A polymer to B polymer is about 3:1 to about 2:1.7.

2. A powder coating composition according to claim 1, wherein the B polymer has about 2 functional groups per polymer chain and the molar ratio of A polymer to B polymer is about 2:1 to about 2:1.7.

3. A powder coating composition according to claim 1, wherein the B polymer has about 3 functional groups per polymer chain and the molar ratio of A polymer to B polymer is about 3:1.

4. A powder coating composition according to any one of claims 2 or 3, wherein said reactive functional group of the A polymer is a condensation-reactive functional group selected from the group consisting of carboxyl, hydroxyl, epoxy, isocyanato, carboxyl anhydride, sulfo, esterified oxycarbonyl, amino and mixtures thereof.

5. A powder coating composition according to any one of claims 2 or 3, wherein said B polymer is a condensation polymer selected from the group consisting of polyamide, polyester, epoxy, polyurethane, polyorganosiloxane and poly(ether).

6. A powder coating composition according to claim 5, wherein said co-reactive functional groups of said B polymer are hydroxyl, carboxyl, epoxy, oxazolinyl, ester, amino, isocyanato or mixtures thereof.

7. A powder coating composition according to claim 6, wherein said A polymer has 3.5 or more carboxyl functional groups per polymer chain.

8. A powder coating composition according to claim 7, wherein said A polymer is a styrene/acrylic acid/α-methylstyrene polymer having a Mn in a range from about 500 to about 50,000.

9. A powder coating composition according to claim 6, wherein said A polymer has 3.5 or more hydroxyl functional groups per polymer chain.

10. A powder coating composition according to claim 9, wherein said A polymer is a styrene/2-ethylhexyl acrylate/2-hydroxyethyl methacrylate polymer having a Mn in a range from about 500 to about 50,000.

\* \* \* \* \*

UNITED STATES PATENT AND TRADEMARK OFFICE
CERTIFICATE OF CORRECTION

PATENT NO. : 6,696,522 B2
DATED : February 24, 2004
INVENTOR(S) : Jeffrey L. Anderson et al.

It is certified that error appears in the above-identified patent and that said Letters Patent is hereby corrected as shown below:

Column 20,
Line 21, please delete "optionally".

Signed and Sealed this

Twenty-fifth Day of October, 2005

JON W. DUDAS
*Director of the United States Patent and Trademark Office*